Patented Apr. 16, 1935

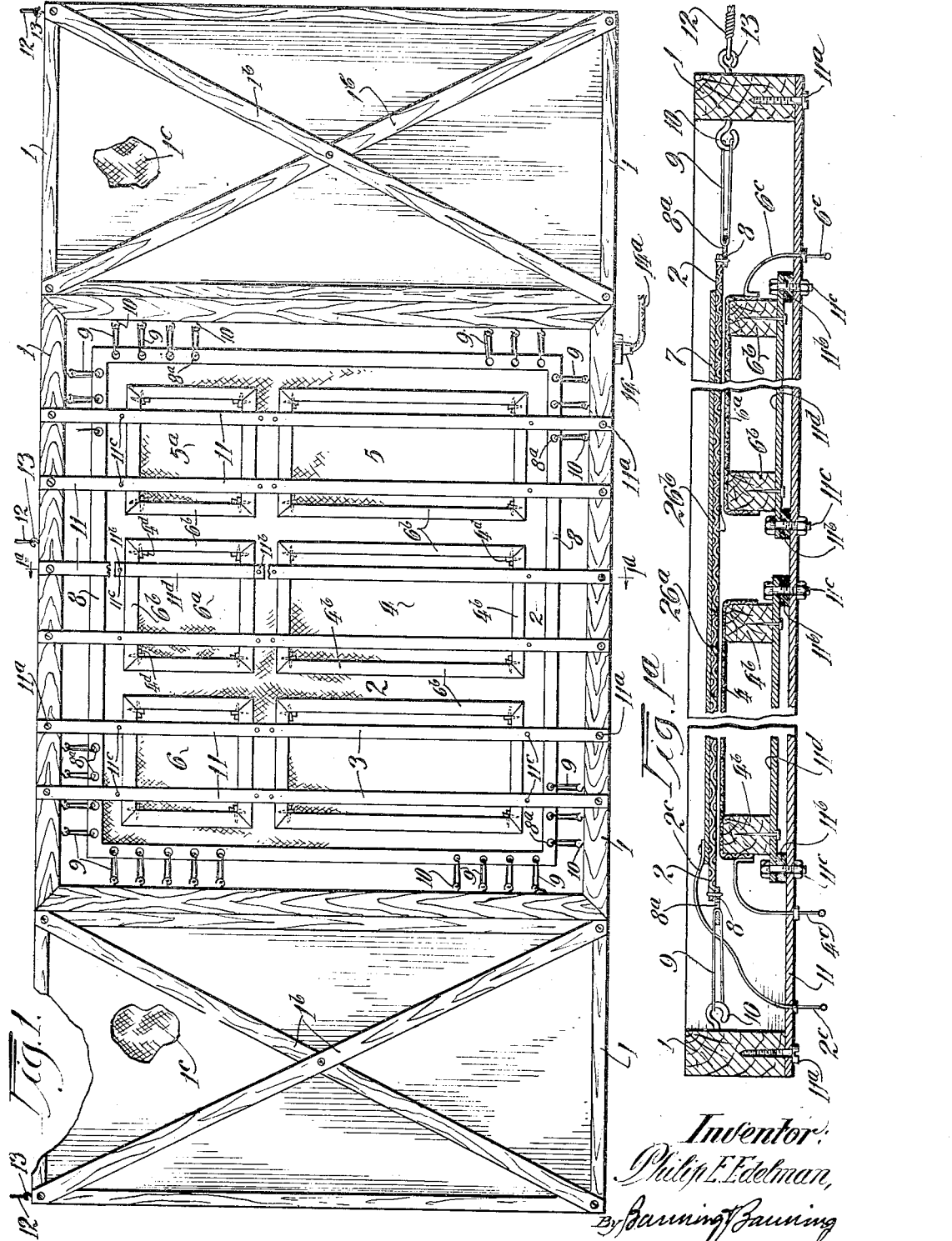

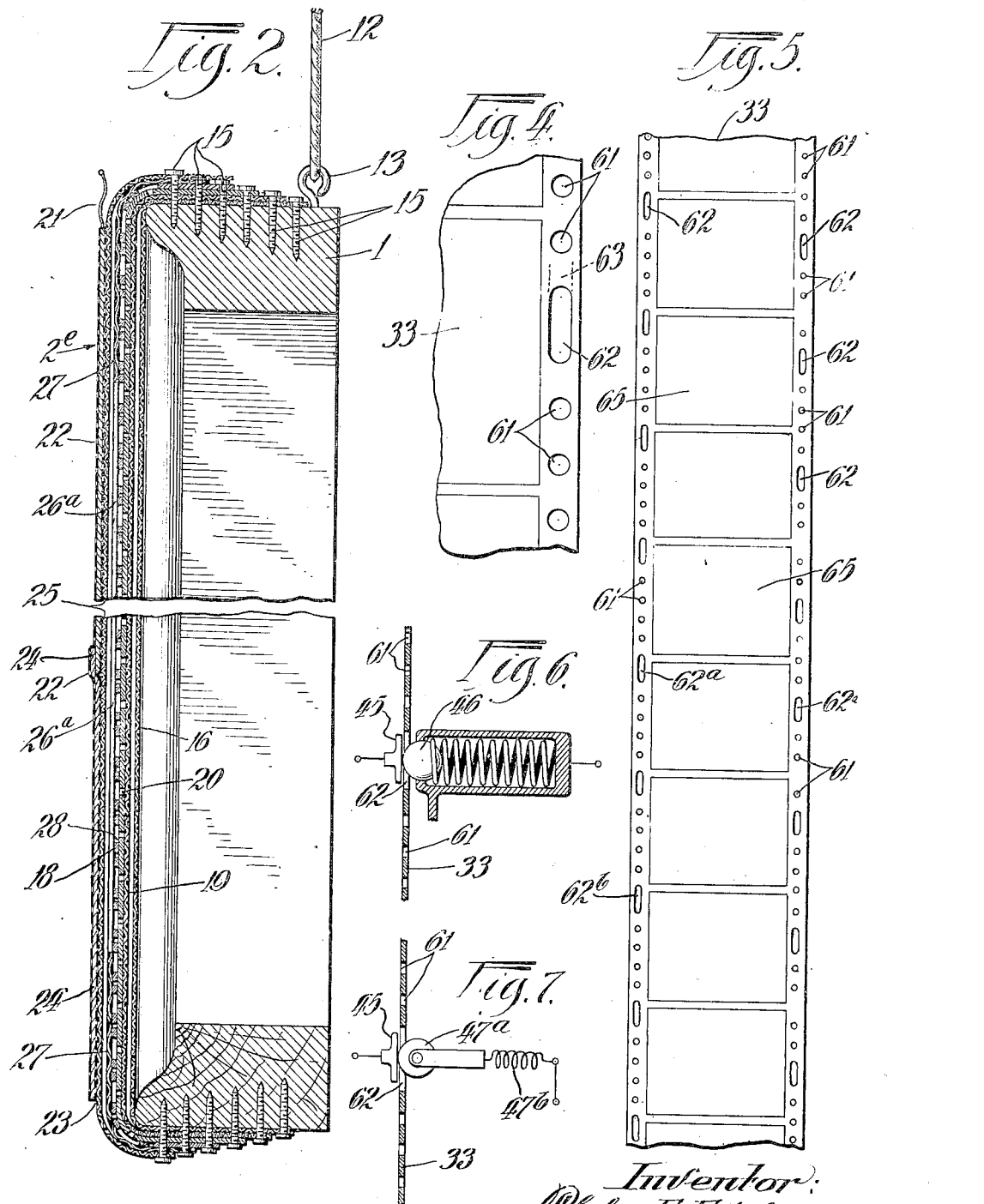

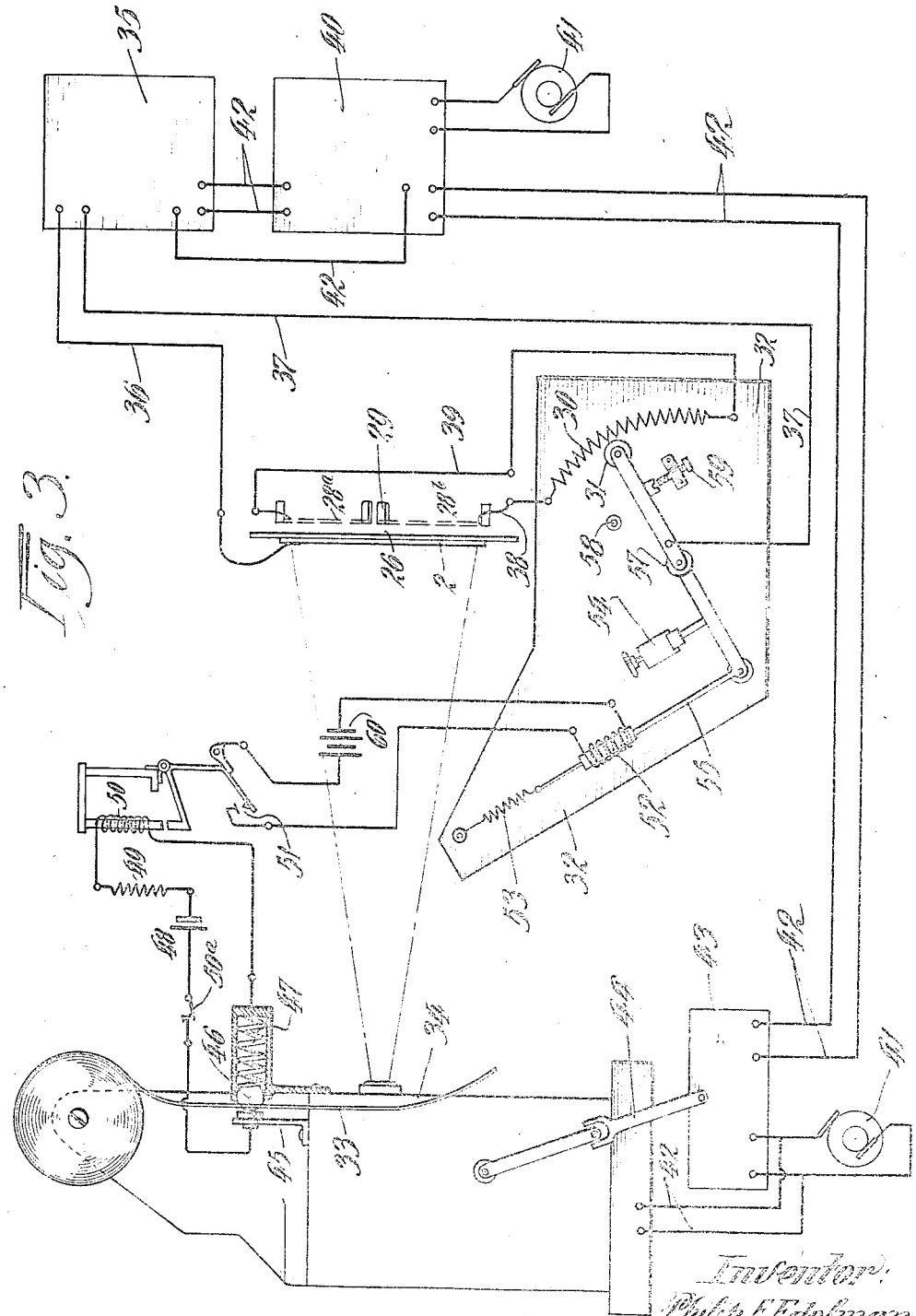

1,997,815

UNITED STATES PATENT OFFICE 1,997,815

TALKING MOTION PICTURE SCREEN

Philip E. Edelman, Chicago, Ill., assignor, by mesne assignments, to Robert T. Mack, trustee, Chicago, Ill.

Application April 22, 1929, Serial No. 356,894

8 Claims. (Cl. 88—16.2)

This invention relates to production of talking moving pictures for either a theater, a school, or a residence.

An object of the invention is to afford a genuine realistic talking moving picture screen, in which the screen literally talks and reproduces music, said screen serving not only to reflect the projected light of the motion picture apparatus, but also to vibrate in response to the sound apparatus of the talking moving picture equipment.

Another object is to provide means whereby the operation of the sound reproducer is controlled by the motion picture film.

Another object is to secure a projection screen of greater projection brilliance. A further object is to simplify the construction and extend the realism of the operation of such equipment, as well as to reduce the bulk and weight thereof.

I have conceived that the most natural reproduction of sound in conjunction with a talking motion picture can be attained by a structure in which the motion picture screen itself acts as the sound reproducing diaphragm. Also I have conceived that by employing a thin metallic screen, it will not only serve as a more efficient means for reflecting the projected light picture of the motion picture apparatus, but also afford more brilliant projection, thereby doing away with the necessity for porous screens heretofore required in the art in order to obtain sound projection at the expense of picture projection quality, caused by loss of screen area in such case.

Reference is made to the accompanying drawings by way of example, in which—

Figure 1 is a rear elevation of the invention embodied in a combined talking motion picture screen suitable for a large theater;

Fig. 1ª is a mid-sectional view taken from Fig. 1 to show the relation of operative parts thereof;

Fig. 2 is a sectional view showing a modification of Fig. 1 suitable for use with school or home talking motion picture apparatus;

Fig. 3 is a schematic diagram for the operation of the talking motion picture screen;

Fig. 4 is a partial plan view of a specially prepared picture film useful in conjunction with the arrangement of Fig. 3;

Fig. 5 is a plan view of a modification thereof employing control slots at both perforate margins of the film;

Fig. 6 is a partly sectioned diagram illustrating the operation of said specially perforated film; and Fig. 7 is a similar view to that of Fig. 6 in which a roller contactor is used.

In the embodiment illustrated in Fig. 1, a main frame 1, preferably made from 2" x 8" lumber, carries an integral projection screen 2 covering substantially its entire front working surface, and combined with a plurality of sound reproduction diaphragms 3, 4, 5, 6, 5a, 6a, for example, each preferably of different structural dimensions, and each preferably responsive to a definite range of audible frequencies.

Screen 2, referring to Fig. 1ª, is preferably constructed of .005" thick empire cloth, or other suitable dielectric material, suitably woven or sewed into an integral sheet, and carrying a thin overlaid front surface 7 of thin overlapped strips of aluminum foil, fastened to element 2 by means of a suitable adhesive material, such as japan varnish gold size. Metallic screen surface 7 on screen element 2 thereby renders one side thereof electrically conductive, as well as a good reflector of light projected thereon, whereby metal 7 further serves as one electrode for all of the co-operating acoustic condenser speaker electrode diaphragms 3, 4, 5, 6, 5a, 6a, aforesaid. There is thus provided a plurality of condenser speakers having a common front electrode 7 which serves the function not only of emitting sound, but also of reflecting light in conjunction with the operating talking motion picture apparatus. Truss members 1b, 1b on frame 1 impart the necessary rigidity thereto, and a counterweight is unnecessary owing to the weight of the frame 1 itself. The portion of frame 1 which has truss members 1b, 1b, is adapted to be covered by customary black fabric margin drapes 1c, 1c, serving as a border for screen 2.

Integral electrode covering 7 of screen 2 is preferably further coated by lacquer, such as cellulose base lacquer colored white with a tinge of orange, or blue, or aluminum bronze pigment, in order to cover over seams and junction lines in element 7, and present a substantially integral projection surface thereon.

Dielectric diaphragm screen 2 has a canvas web 8 sewed along its rim. Canvas web 8 has metallic rings or eyelets 8a spaced six inches apart thereon. A continuous rope 9 is looped in and out of eyelets 8a, 8a, etc., and over cooperating hooks 10 similarly spaced on frame 1, whereby dielectric screen diaphragm 2 may be drawn as taut as required, and held stretched on main frame 1. Screen 2 with its metallic surface 7 will thereby be held substantially in a flat plane carried by frame 1. An eye-ring 13 on frame 1 carries hoisting rope 12, so that the entire frame 1 and all members supported thereby may be hoisted up into the ceiling wing of a theater out of the way when desired.

Very small air gaps 26a, 26b, Fig. 1a, are provided between the rear of diaphragm screen 2 and the co-operating back electrode diaphragms, as for instance, 4, 6a. These air spaces are normally too small to be visible, but vary and alter in dimensions during operation of the sound reproducing diaphragms 2, 4, and 6a. The normal dimension of gap 26a or 26b may be initially adjusted by means of screws 11c. Main frame 1 carries a plurality of sub-frame supports 11. Co-operating frame supports 11d are cushion mounted on sub-frame supports 11 through rubber gaskets 11b and machine screws 11c, so that the relative distance between member 11d and sub-frame support 11 may be adjusted. The back electrode frame, as 4b, or back electrode diaphragm 4, is carried by the support member 11d, whereby the air gap 26a may be initially adjusted and aligned for the desired result, as aforesaid. The back electrode diaphragm 4 is preferably of porous air permeable construction, such as is afforded by Dutch woven fine textured metal cloth, or in the manner illustrated in Fig. 2, characterized by a flexible structure acting as both an electrode of an acoustic condenser, and one of the operating diaphragms thereof.

A flexible terminal 2c is brought from metal surface 7 on screen 2 and supported by frame 1. Similarly, a flexible conductor lead 4c connects with electrode diaphragm 4, and is supported on sub-frame 11. Also a similar flexible lead 6c is separately brought from electrode diaphragm 6a, and supported on sub-frame 11. Back electrode diaphragm 6a is similarly supported through frame members 6b in the manner described for electrode diaphragm 4. Fasteners 11a hold frame members 11 on frame 1. The preferred manner of assembly is to first stretch screen 2 on frame 1, then prepare sub-frame members 11 with the rear electrode diaphragm members 3, 4, 5, 6, 5a, 6a, whereupon sub-frame supports 11 are fastened to main frame 1 by screws 11a. Thereafter machine screws 11c may be adjusted to correctly position each back electrode member, such as 4, 6a, with proper small normal air space 26a, 26b respectively adjacent to the rear surface of screen dielectric diaphragm 2. Dielectric diaphragm 2 is common for all the rear electrode diaphragm members 3, 4, 5, 6, 5a, 6a respectively, and electrode 7 is carried thereby so that the combined member 2, 7 acts as a sound reproducing diaphragm, as well as a projection screen.

Each rear electrode diaphragm, such as 4, 6a, also serves as a sound reproducer element, and contributes to the ensemble effect because fabric margin material 1c covering the cross end frame members 1b of main frame 1 is porous and permeable to sound waves passing therethrough. No baffle board of any sort is required. A very full range of tone response may thus be had in any desired volume and with full richness of overtones, accompanied by brilliant fidelity and realistic reproduction.

Each back electrode sub-frame, as for example 6b, may further be adjusted in normal tension with respect to back electrode member, such as 6a, by means of small wedges 4d. A suitable dimension for screen 2 is of the order of 16 feet high by 21 feet wide, while co-operating rear electrode diaphragm members 3, 4, 5, 6, 5a, 6a may range variously as desired from 36" by 48" down to 20" by 20". Preferably, the small rear electrode diaphragm members, as 6, 6a, 5a, are disposed at the upper portion of frame 1 so that selective voice reproduction effects may be attained co-related to the reproduction of, for example actors and actresses on the front of screen 2 covered by metal foil 7. Full orchestra volume of sound reproduction may be attained by the joint simultaneous use of all the co-operating rear electrode members 3, 4, 5, 6, 5a, 6a. This may be accomplished manually or automatically, as hereinafter set forth. The rear frames 4b, 6b, etc., are, of course, invisible to an audience located to face metal screen surface of screen diaphragm 2. Diaphragm 2 with its metal surface 7 may be washed when necessary to keep same free from dirt which dulls projected pictures projected thereon.

Since metal surface 7 is common to all the individual speakers provided by co-operating back electrode diaphragms 3, 4, 5, 6, 5a, 6a, respectively, a common polarizer unit may be used therefor, as is now customary in this art, while any two or more of the electrode diaphragms, such as 6, 6a, for example, may be operated from a common output transformer of a vacuum tube amplifier. A surprisingly realistic reproduction effect is thereby attained.

A cable 14a with separable plug 11e may be carried by frame 1 to provide electrical connections to member 7, and each electrode diaphragm as 4, 6a, for example, in the manner aforedescribed. Cable 14a is thereby adapted to be separated from plug 14 carried by frame 1 when frame 1 is hoisted out of service position by means of hoist ropes 12. This construction facilitates stage productions as no back-stage space of any considerable dimension is required for the combined talking motion picture screen aforesaid. In contradistinction to this, much time is required to disconnect and remove large bulky horns from position behind porous projection screens, as in the prior art.

A simpler construction is shown for home use in Fig. 2, as in such case the frame 1 may have much smaller dimensions, such for example, as 2 feet by 3 feet.

The structural relation of the smaller diaphragm screen parts combined with an acoustic condenser is preferably made with a vibrating screen diaphragm 2, which is composed of a flexible thin stretched sheet of empire cloth 25 coated with varnish size 23, upon which layers of thin aluminum foil 24, 21 are fastened by means of varnish. A thin layer of substantially transparent lacquer, or white lacquer tinged with blue pigment, or aluminum bronze varnish 22 is coated over aluminum foil strips 21, 25 to make a smooth integral screen surface 2e.

Diaphragm screen 2 is separated from and supported closely adjacent to co-operating flexible electrode porous diaphragms 28, so that a very small air gap 26 separates member 2 from normal contact with member 28. Each porous electrode diaphragm 28 is permeable to air flow and constructed from a piece of metal tinsel cloth 19, to which perforated cross strips or ribbons of thin soft metal 20 are fastened by an electrically conductive adhesive or solder 20a. Co-operating perforated ribbons of lead foil 18 are attached in spaced relation over strips 20. Electrical operating potential may be applied to aluminum foil 21 carried by diaphragm sheet 25, and to tinsel metal cloth 19, to cause air gap 26 to vary in relative size and produce sound waves from non-porous diaphragm 2, as well as from porous diaphragm 28. To control vibration of diaphragms 2 and 28 and limit amplitude thereof, a thin porous rim sheet of loosely stretched fabric 27 is placed between members 2 and 28, only at the rim portion thereof, and loosely disposed with respect thereto. Fabric 27 does not cover the main air gap 26 at the center portion 26a.

A similar fabric vibration controller sheet 16 of soft texture is stretched at the back side of tinsel cloth 20 for a similar purpose. A frame 1 carries a mounting eyelet 13 and a plurality of tacks 15 to fasten the cloth 16, the tinsel cloth 20, the fabric 27, and the non-porous diaphragm 25 respectively thereto in operative relation. A substantially smooth dull finished reflecting surface suitable for picture projection and characterized by non-porous structure is thereby afforded by member 2, while members 2 and 28 cooperate as acoustic condensers for sound reproduction. The function of cloth 27 and cloth 16 is to dampen or limit the amplitude of vibrations of the members 2 and 28.

Frame 1 may have an operative area of any suitable size, such for example, as 3 feet by 3 feet for home use or 8 feet by 12 feet for school use, and in any case screen surface 2 will have an integral structure or surface upon which light may be projected, while electrode members 28 may be divided into any desired number of insulated sections stretched at the rear thereof, as indicated in Fig. 1. Dull finished aluminum foil affords a most desirable motion picture screen structure, being efficient and non-porous so that none of the brilliance of projection is lost, as in the case of porous screens heretofore required for reproduction of talking motion pictures. The aforesaid lacquer coating thereon assists this result.

The frame 1 and the aforesaid elements carried thereby are light in weight and of small total thickness, so that same may be hoisted out of the way through hooks 13 to make room for other stage productions with minimum loss of time. Surface 2 is smooth and waterproof and may be easily cleaned without detriment to operation thereof. For home or school use, a single member 28 may be used, as shown in Fig. 2. When electrical potential of varying intensity is applied to metal foil 21 and to tinsel cloth 19, air gap 26 varies in its dimensions, causing diaphragms 2 and 28 respectively to emit sound waves faithfully reproducing the original source of sound energy electrically transmitted thereto with full brilliance of tones and accompanying overtones thereof.

While combined screen and sound diaphragm 2 of Fig. 1 may be used in a customary manner, a preferred operation thereof is indicated in Fig. 3 by way of example. In addition to the usual operation of projecting pictures on diaphragm screen 2 and the emission of sound waves according to the excitation thereof, a plurality of rear porous electrode diaphragms 28a, 28b, of differently proportioned sizes and pitch tone response characteristics are employed. Same are selectively and automatically proportioned in relative volume response by means of a resistance member 30 over which a roller contact 31 travels governed by mechanism 32, which is operated automatically by the travel of film 33 of projecting apparatus 34. The object thereof will now be explained prior to description of detailed means employed for the purpose.

Assuming a customary dialogue between a male actor and an actress to be reproduced in picture and voice on screen member 2, rear electrode diaphragm 28a may be proportioned more predominantly responsive to soprano sound frequencies, while section 28b separated therefrom by space 29 may be constructed more responsive to lower frequencies representing sound energy. This difference in response can readily be secured by choice of different areas and structural dimensions for members 28a and 28b. Members 28a and 28b are operatively electrically connected to sound reproducing vacuum tube electrical unit 35 through wires 36, 37, 38 and 39. The relative volume of response may be widely varied according to the position of contact roller 31 on resistance 30, thereby connecting more or less resistance in series with the members 28a, 28b, respectively.

While this may be accomplished manually, I have conceived that the travel of film 33 itself may be utilized for automatic control thereof according to the varying requirements of the picture projected therefrom on screen diaphragm 2. Vacuum tube amplifier 35 is operated by power unit 40 connected to a source of operating current 41. Cables 42 make the usual connections for this purpose, as is customary in the art. The customary step-down transformer output of unit 43 may be applied to cable 42, while the usual step-up transformer input from cable 42 may be applied to unit 40 in usual manner. Electrical sound record pick-up apparatus 43 operated in customary manner is connected by a universal shaft 44 for synchronous operation with projecting apparatus 34, as is usual in the art.

Film 33 traveling in projection apparatus 33 passes between contact elements 45 at the rear of film 33 and 46 at the front of film 33. Spring 47 causes metal contactor 46 to contact with contactor 45 when a suitable perforation prepared in the margin of film 33 is traveling past the contactors 45, 46 but not at other times, as the film material 33 separates contactors 45, 46 except when the prepared perforation of suitable size therein is in operative location between contactors 45 and 46. A single dry cell 48 serves for operating current source connected with contactors 45, 46, and is further reduced in its supply of operating current by series resistance 49 connected to sensitive relay 50. Fire risk is thereby obviated as the current passing between contactors 45, 46 is too feeble to ignite film material 33.

Relay 50 causes contacts 51 to make or break according to the aforesaid travel of the prepared film 33. Manual switch 50a is provided for control against false operation near the start or finish of travel of the film 33. Relay contacts 51 control solenoid 52 actuated from battery 60. A spring 53 of apparatus 32, and a dash-pot 54 thereof regulate the normal position of member 55 actuated by solenoid 52 when contacts 51 are open. A co-operating lever 56 operated on pivot support 57 of device 32, is actuated by member 55 and causes roller contact 31 to move over resistance element 30 between stop limits 58 and 59. Stop limit 59 of member 32 is made adjustable. When contacts 51 are closed as aforesaid, the position of roller contact 31 on resistance member 30 is changed to alter the relative volume of response of the electrode diaphragm members 28a and 28b. This relative volume may be controlled in any desired intensity proportion for the aforesaid purpose.

As shown in Fig. 4, regular film 33 having usual rim perforations 61 has a prepared extra and larger area perforation 62 to control operation of contacts 45 and 46 of Fig. 3. The larger size and contour of controller perforation 62 disposed at intervals along rim 64 of film 33 is indicated by dotted lines 63. Contactor 46 of Fig. 3 is proportioned so that no contact will be made by contactors 46 and 45 when holes 61 are in position therebetween, as perforations 61 are too small and of incorrect contour to permit this. But enlarged slot 62 in film margin 64 of film 33 is shaped to permit contact to be made as aforesaid. Dashpot 54 of the device 32, Fig. 3, introduces a time lag for smooth operation of the proportioning apparatus aforesaid. As shown in Fig. 5, film 33 carrying picture portions 65 and usual perforations 61 is provided with enlarged contact control perforations 62. These may be made as required in any suitable manner, manually or automatically, as the film 33 is prepared, or at any time thereafter.

Fig. 6 shows an enlarged view in which contactors 45 and 46 meet through the enlarged perforation 62 in the margin of film 33. A preferred structure for the contact control mechanism is shown in Fig. 7. A contact roller 47a is held toward contactor 45 by spring 47b, and permitted to contact therewith only when contact controlling perforation 62 of film 33 is aligned in operative position with respect thereto, but not when smaller usual film rim perforations 61 travel between contacts 45 and 47a. The contact controlling perforations may be disposed at one or both rim perforations of the usual film in the aforesaid manner, or any obvious equivalent thereof.

In using the specially perforated standard film 33 in the case of either a photophone or vitaphone reproduction, I may employ two or more control contactors, as shown in Fig. 7 and Fig. 3, by employing control perforations 62 at both perforated margins of film 33. At least one of said control perforations may be employed to start a desired auxiliary sound effect, while another thereof may be used to terminate the duration thereof, an example being the auxiliary use of a theater organ with its percussion instruments, or an electromagnetically controlled stage thunder and lightning producer apparatus, automatically operated by means of the aforesaid extra contactors 47a, 45 of Fig. 7 on one of the specially perforated margins of film 33 of Fig. 5, using perforations 62a, 62b respectively for such auxiliary effect.

The electrical speakers are not normally capable of sufficient volume to correctly imitate a pistol shot or thunder storm for auxiliary stage effect. It has been proposed heretofore to manually operate one or more speakers by causing the motion picture operator to follow a prepared time schedule, but same is unreliable and likely to be incorrectly executed because it is very difficult to co-relate a manual operation of this kind with regular picture projection.

Switch 50a is to be used, as shown in Fig. 3, when the automatic operation of the control device 32 is not desired, such as near the end of a reel of film which is being operated. Roller 47a, Fig. 7, should be proportioned to co-operate with the special extra perforations 62 of film 33, Fig. 5, as aforesaid, in obvious manner, that is to say, so that contact will not be made when perforations 61 pass between contactors 47a and 45, but only when special control perforations, such as 62 proportioned for the said purpose travel in alignment for the stated purpose.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A combined projection screen and condenser reproducer combination, comprising a main frame, a dielectric screen member supported thereby, a plurality of co-operating condenser electrodes, supporting means for said condenser electrodes, means to adjustably position said condenser electrodes with respect to said dielectric screen member, and a common co-operating electrode member carried by said dielectric screen member.

2. A combined sound and picture reproducing diaphragm consisting of a substantially flat insulating fabric, an electrically conductive light reflecting coating carried on one side of said fabric adapted to act as a motion picture screen, cooperating electrode members positioned to comprise an electrical condenser with respect to said electrically conductive coating, and means to apply audio frequency potentials and polarizing potential to energize said electrical condenser whereby said fabric is vibrated.

3. A combined sound and picture reproducing diaphragm and light reflecting screen comprising a substantially flat insulating sheet, a first metallic coating carried on one side of said sheet, a second coating placed over said metallic coating to adapt it as a motion picture screen, an electrode positioned adjacent to the other side of said sheet, and means to impress pulsating operating potentials of electricity on said electrode and on said metallic coating to vibrate said insulating sheet.

4. A combined sound and picture reproducing diaphragm and light reflecting screen comprising a substantially flat non-porous light reflecting electrode, a co-operating perforated electrode positioned to form a condenser therewith, a light dispersing layer coated on said light reflecting electrode adapted to act as a motion picture screen, and means to apply operating electricity to said electrodes to vibrate said light reflecting non-porous electrode.

5. A combined sound picture diaphragm and reflecting screen comprising a thin metallic light reflecting layer, a fibrous support flexibly attached thereto, a partially transparent coating carried on said metallic light reflecting layer adapted to act as a motion picture screen, an electrical terminal connected to said metallic layer, a co-operating air permeable electrode positioned adjacent to said fibrous support to form a condenser with respect to said metallic layer, and means to impress pulsating electrical currents on said air permeable electrode and on said electrical terminal to vibrate said thin metallic light reflecting layer to produce sound.

6. A combined sound picture diaphragm and light reflecting screen operated in contact with atmospheric air, comprising a thin combined light reflecting layer and electrical electrode, a flexible support member for said electrode attached thereto, a thin layer of substantially transparent varnish coated on said electrode adapted to act as a motion picture screen, a plurality of co-operating perforate electrode members positioned to form electrical condensers with respect to said combined light reflecting layer and electrical electrode, and electrical means to actuate one of said condensers so formed to condense or rarefy the atmospheric air normally contacting with said electrodes.

7. A motion picture screen having a rectangular metal surface which constitutes one electrode of an electrostatic loudspeaker, and a second electrode mounted in operative relation to said first electrode.

8. In an electrostatic loud speaker, fixed and movable diaphragms, one of said diaphragms being provided with means forming a screen for the projection of pictures.

PHILIP E. EDELMAN.